United States Patent [19]

Liu, Yunzhao

[11] Patent Number: 5,344,204
[45] Date of Patent: Sep. 6, 1994

[54] SAFE DRIVER SEAT UNIT IN A MOTOR VEHICLE

[76] Inventor: Liu, Yunzhao, Building #9, Litangnandiweixiaofushuyiyuan, Binyang County, Guangxi Province, P.R.C., China

[21] Appl. No.: 14,552

[22] Filed: Feb. 8, 1993

[30] Foreign Application Priority Data

Feb. 9, 1992 [CN] China .............................. 92 1 00620.9

[51] Int. Cl.⁵ .............................................. B60N 2/42
[52] U.S. Cl. ................................ 296/68.1; 297/216.1; 297/216.16
[58] Field of Search ................... 296/68.1; 297/216.1, 297/216.15, 216.16, 216.18

[56] References Cited

U.S. PATENT DOCUMENTS

| | | | |
|---|---|---|---|
| 3,186,760 | 6/1965 | Lohr et al. | 297/216.8 |
| 3,578,376 | 5/1971 | Hasegawa et al. | 296/68.1 |
| 3,832,000 | 8/1974 | McDonnell | 296/68.1 |
| 3,992,046 | 11/1976 | Braess | 296/68.1 |
| 5,167,421 | 12/1992 | Yunzhao | 297/216 |

*Primary Examiner*—Russell D. Stormer
*Attorney, Agent, or Firm*—Jacobson, Price, Holman & Stern

[57] ABSTRACT

A safe driver seat unit in a motor vehicle includes a seat supported on two rails by four ball bearings mounted in the seat legs, and a locking arrangement having a locking effect and requiring less electric current than previously to actuate. In a normal position of the seat, the springs provided in front of the seat are compressed and an impacting electromagnetic controller locks the seat. When a collision takes place, a deformation of sensors will turn on the power to unlock the seat, and then the biased springs force the seat to move backwardly away from the dangerous area, while the braking electromagnetic controller automatically brakes the motor vehicle.

7 Claims, 4 Drawing Sheets

FIG. 8A FIG. 8B FIG. 9A FIG. 9B
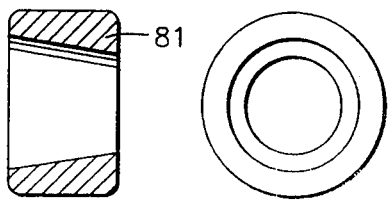
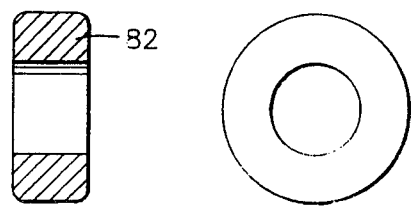
FIG. 10A FIG. 10B FIG. 11A FIG. 11B
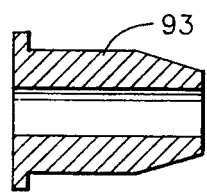
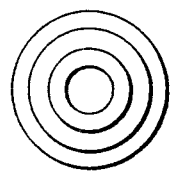
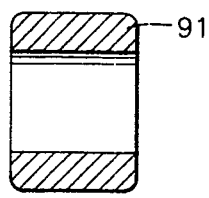
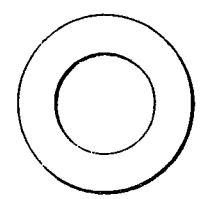
FIG. 12A FIG. 12B
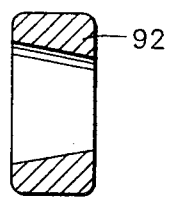
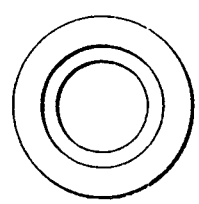
FIG. 14A FIG. 14B
FIG. 13A FIG. 13B
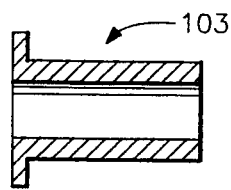
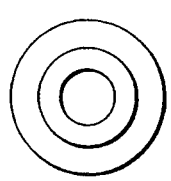
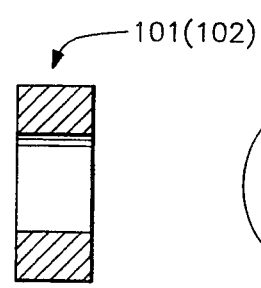
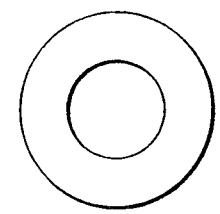

SAFE DRIVER SEAT UNIT IN A MOTOR VEHICLE

INTRODUCTION OF THE INVENTION

The present invention relates to a seat in the front of a motor vehicle, and particularly to a seat unit for the driver in a motor vehicle, which, during occasion of a collision, prevents the driver and/or passengers on the front seats from being injured by means of moving their seats backwardly and braking the motor vehicle automatically. According to the invention a seat is supported on two rails by means of four ball bearings mounted in the seat legs. In a normal position of the seat, the springs provided in front of the seat are compressed and an impacting electromagnetic controller locks the seat. When a collision takes place, the deformation of sensors will turn on the power to unlock the seat, and then the biased springs force the seat to move backwardly away from the dangerous area.

BACKGROUND OF THE INVENTION

In the applicant's U.S. Pat. No. 5,167,421 which is entitled "Safety Seat Equipped in Automobile" and filed on Jan. 5, 1991, a safety seat is disclosed. The seat is supported with four ball rollers in pipe rails. In a normal state of the seat, the springs in front of the seat are compressed, a common electromagnetic locking arrangement locks the seat, and several separated sensors are arranged on the parts of the motor vehicle being prone to be collided with. When a collision takes place, the sensors are damaged to deform to have power on and the electromagnetic locking arrangement removes the pin inserted and have the seat released.

However, the safety seat with above structure has the disadvantages that the freedom of the ball rollers in the pipe rails is not satisfied. Further, under the state of the springs being compressed, it is difficult and requires great electromagnetic force for the inserted pin to be pulled out. That is, much electric current is required to generate an electromagnetic force.

Accordingly, the object of the invention is to provide an improvement of the cited seat. The seat unit provided by the present invention adapts four ball bearings to bring about the satisfied freedom of movement of the seat, and an improved locking arrangement which, with satisfied locking effect, requires less electric current to pull out the locking member and to release the seat.

SUMMARY OF THE INVENTION

According to the present invention, a safe driver seat unit in a motor vehicle is provided to comprise: a seat, a supporting arrangement, a rail unit, a locking arrangement, sensors, an electric braker, a sensing switch K2 is connected with the sensors in parallel; a braking electromagnetic controller is connected with the electromagnetic controller of the locking arrangement in parallel; and above parallel connections are connected with an electric battery E and a power switch K1 in series; the seat is provided solidably on the rails; in front of the seat are arranged springs; the locking arrangement is controlled by the electromagnetic controller, the springs are used to push the seat to move backwardly in the off-lock state of the seat; the electric braker comprises the braking electromagnetic controller and the braking control lever and is provided to apply automotive braking operation on the motor vehicle synchronized with the releasing operation by the lock arrangement; when the sensor deformed by the vehicle is collided with; the braking control lever is connected with a brake pedal operated by the driver; the sensors generally arranged at the parts of a motor vehicle where it is prone to be collided with, each of which comprises a deformable thin wall metal pipe and a metal rod which inserts in and insulates from the wall pipe; the supporting arrangement has an n-shaped frame; two supporting shafts respectively extend through the two side walls of the frame in parallel and mounted therein by nuts; at the inner sides of the frame, backup plates, ball bearings and spring acting cylinders are respectively and serially arranged on each supporting shaft; the backup plates and the spring acting cylinders have outer diameters less than the inner diameter of the outer rings of the ball bearings; on each of supporting shafts, an adjusting cylinder is arranged between each pair of spring acting cylinders; a thread is formed in one end of the adjusting cylinder to fit with the adjusting nut, a clamping nut of the adjusting nut, and a spacer, one end of the adjusting nut has a shape of a cylinder and a follower sheet is arranged between the tip of the cylindrical end and the spring acting cylinder; under the coaction of the nuts and the adjusting nut, the inner rings of the ball bearings and the side walls of the frame are fixedly mounted together, the rail unit has two parallel rails mounted on the fixed floor and extend longitudinally thereon; an upper cover is fixed on the rails with screws, and back and front plates are mounted at the front and back ends of the rails respectively; the rails are rectangular blocks; a longitudinal groove is formed in each rail; the fourth ball bearings are arranged in pair in the longitudinal grooves; the width of the longitudinal grooves is correspondent to the outer diameter of the outer ring of the ball bearings; at the back ends of the rails is pivoted a retaining hook which has a head formed downwardly and backwardly; the upper cover has a hole formed correspondingly to the position of the hook for the rotative movement of the hook; a hole is formed in the back plate for the manual operation to release the seat locked by the hook; buffer cushions made of sponge material are arranged at the back ends of the longitudinal grooves; the two ends of each of springs are mounted on the front plate and the spring acting cylinders of the front supporting shaft respectively; the driver seat unit further comprises a reset arrangement of the seat unit comprising a return bolt which extends through the front plate and fit with the nut mounted at the inner side of the n-shaped frame; between the head of the bolt and the outer side of the front plate is fit with a nut on the threaded body of the bolt; the locking arrangement comprises the electromagnetic controller, a moving bar, a moving head, a locking member, an upper locking socket and a lower locking socket; the upper locking socket is mounted on a plate on the n-shaped frame; the lower locking socket is correspondingly arranged on the cover of the rails, in normal state of the seat unit, the upper and lower locking sockets are in alignment; the locking member, having a shape correspondent to that of the center holes of the locking sockets, extends therein; the moving bar is fixedly connected with the moving head; the moving head is arranged in the electromagnetic controller, the moving bar extends in the center hole of the locking member, a flange is formed at the end of the moving bar, which extends out of the center hole of the locking member, the outer diameter of the flange is less than the smallest diameter of the center holes of the upper and lower locking sockets, and greater than that of the center hole of the locking member.

Preferably, the center holes of the upper and lower locking socket form completely tapered center holes after alignment and the locking member has a correspondent tapered shape.

Alternatively, the upper locking socket has a tapered center hole, the lower locking socket has a cylindrical center hole and the locking member has a correspondent shape of a combination of taper and cylinder.

Alternatively, the upper locking socket has a cylindrical center hole, the lower locking socket has a tapered center hole, and the locking member has a correspondent shape of combination of cylinder and taper.

Alternatively, both the center holes of the lower and upper locking socket have a shape of a cylinder with the same diameter and the locking member in correspondently cylindrical shape.

Preferably, the electromagnetic controller has a cylinder case, in which a coil and a thin wall cylinder are arranged in the thin wall cylinder at the inside of the coil series; the thin wall cylinder is made of non-magetconductive material; the cylindrical moving head is arranged in the thin wall cylinder, a magnetconductive member is provided in the upper part of the case; through holes are formed in both the upper side of the case and the magnetconductive member.

Alternatively, the electromagnetic controller and/or the braking electromagnetic controller are generally linear motors; in the case of the motor, the iron-core is fixed by screws, coils are wound on the iron-core; the moving head is made of silicon steel plates and have a armature coil; a moving bar is connected with the moving head with a coupler fixed connected with the moving bar.

Further objects and advantages of the invention will appear from the following description taken together with the accompanying drawings.

BRIEF DESCRIPTION OF THE DRAWINGS

FIGS. 8A, 8B are respectively the sectional and side views of the upper locking socket according to the second embodiment of the invention.

FIGS. 9A, 9B are respectively the sectional and side views of the lower locking socket according to the second embodiment of the invention.

FIGS. 10A, 10B are respectively the side and sectional views of the locking member according to the third embodiment of the invention.

FIGS. 11A, 11B are respectively the sectional and side views of the upper locking socket according to the third embodiment of the invention.

FIGS. 12A, 12B are respectively the sectional and side views of the lower locking socket according to the third embodiment of the invention.

FIGS. 13A, 13B are respectively the side and sectional views of the locking member according to the fourth embodiment of the invention.

FIGS. 14A, 14B are respectively the sectional and side views of the upper and lower locking sockets according to the fourth embodiment of the invention.

DETAILED DESCRIPTION OF THE PREFERRED EMBODIMENTS

Figure 1:
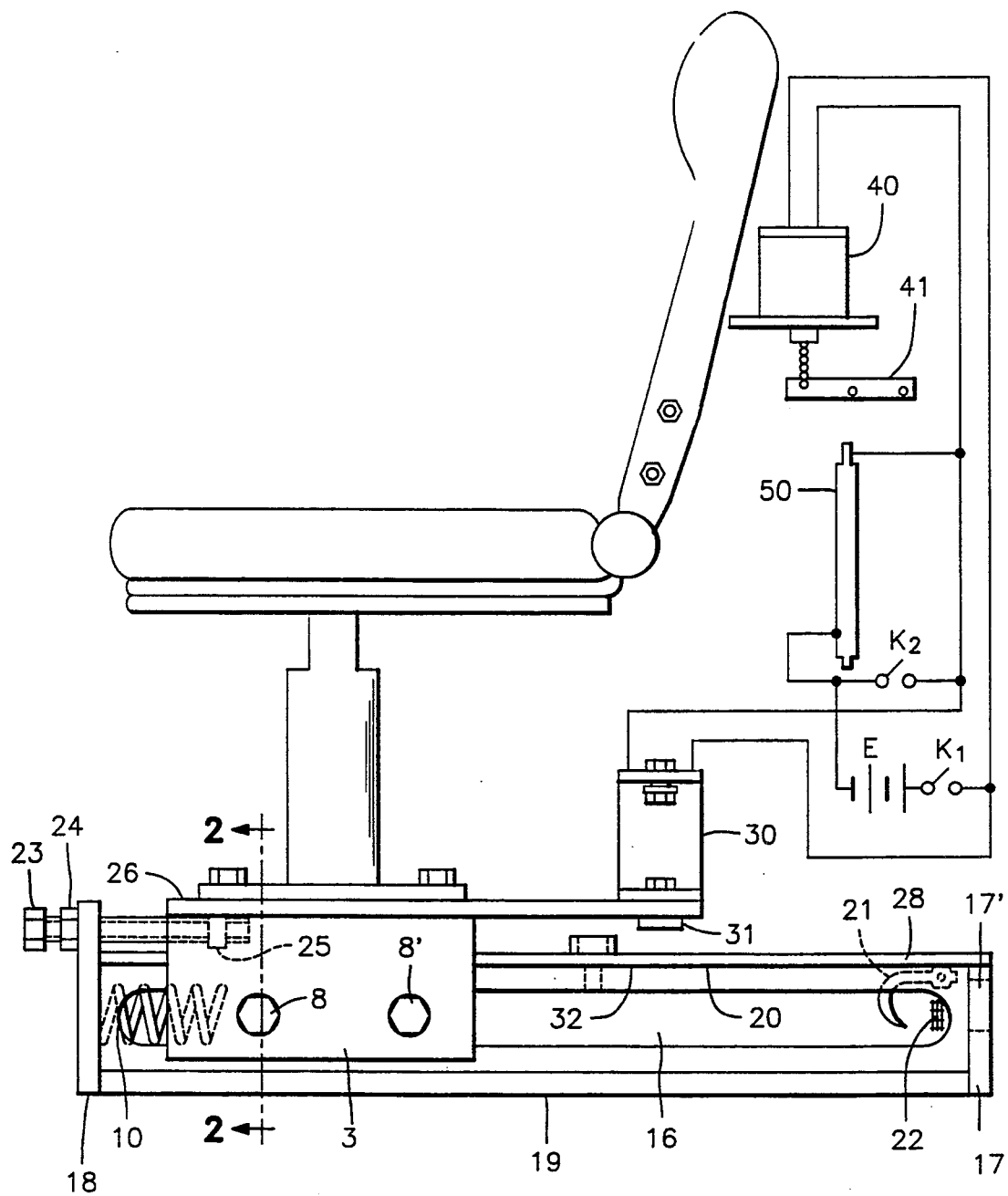
FIG. 1 is a general view of a novel driver seat unit according to the present invention.

The reference is first made to FIG. 1. A safe driver seat unit according to the present invention comprises a seat, a supporting arrangement, a rail unit, a locking arrangement, sensors 50, an electric braker and a reset arrangement. A sensing switch K2 is connected with the sensors 50 in parallel. A braking electromagnetic controller 40 is connected with the electromagnetic controller 30 of the locking arrangement in parallel. Above parallel connections are connected with an electric battery E and a power switch K1 in series.

The seat according to the present invention is provided on the rails 16, 16'. In front of the seat are arranged compressed springs 10. The locking arrangement is controlled by the electromagnetic controller 30. The springs are used to push the seat to move backwardly in the off-lock state of the seat. The braking electromagnetic electric braker comprises the controller 40 and the braking control lever 41 and is provided to apply an automotive braking operation on the motor vehicle synchronized with the releasing operation by the lock arrangement when the sensor is so deformed by the vehicle collision since current passes through the controller 40, the braking control lever 41 is connected with a brake pedal. In the normal state, there is no current passing through the controller 40 so that the controller 40 cannot hinder brake operation by the driver. Sensors 50 are generally arranged at the parts of a motor vehicle which is prone to be collided with. Each of sensors 50 comprises a deformable thin wall metal pipe and a metal rod which inserts in and is insulated from the wall pipe.

Figure 2:
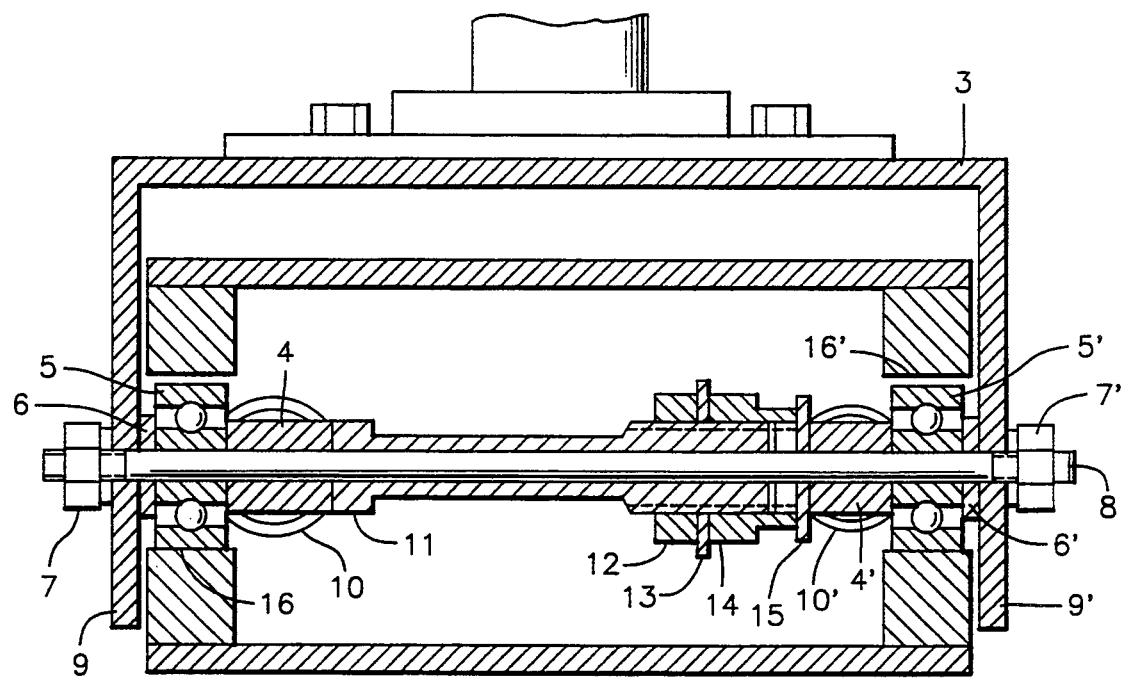
FIG. 2 is a schematic sectional view showing the assembly of the supporting arrangement and the rails of the seat unit.

The supporting arrangement (see FIG. 2) has an n-shaped frame 3. Two supporting shafts 8, 8', with the same structure, respectively extend through the two side walls of the frame 3 in parallel and mounted therein by nuts 7, 7'. At the inner sides of the frame 3, backup plates 6, 6', ball bearings 5, 5' and spring acting cylinders 4, 4' are respectively and serially arranged on each supporting shaft. The backup plates 6, 6' and the spring acting cylinders 4,4' have outer diameters less than the inner diameter of the outer rings of the ball bearings 5, 5'. On each of supporting shafts 8,8', an adjusting cylinder 11 is arranged between each pair of spring acting cylinders 4, 4'. A thread is formed in one end of the adjusting cylinder 11 to fit with the adjusting nut 14, a clamping nut 12 of the nut 14, and a spacer 13. One end of the adjusting nut 14 has a shape of a cylinder and a follower sheet 15 is arranged between the tip of the cylindrical end of the nut 14 and the spring acting cylinder 4'. Under the coaction of the nuts 7, 7' and the adjusting nut 14, the inner rings of the ball bearings 5, 5' and the side walls 9, 9' of the frame 3 are fixedly mounted together. The rail unit has two parallel rails 16, 16' mounted on the fixed floor 19 and extend longitudinally thereon. An upper cover 20 is fixed on the rails with screws, and back and front plates 17, 18 are mounted at the front and back ends of the rails respectively. The rails 16, 16' are rectangular blocks. A longitudinal groove is formed in each rail. The four ball bearings are arranged in pair pairs in the longitudinal grooves. The width of the longitudinal grooves corresponds to the outer diameter of the outer rings of the ball bearings 5,5'. At the back ends of the rails 16, 16' is pivoted a retaining hook 21 which has a head formed downwardly and backwardly. The upper cover 20 has a hole 28 formed correspondingly to the position of the hook 21 for the movement of the hook 21. A hole 17' is formed in the back plate 17 for manual operation to release the seat locked by the hook 21. Buffer cushions 22 made of sponge material are arranged at the back ends of the longitudinal grooves. The two ends of each of spring 10, 10' are mounted on the front plate 18 and the spring acting cylinder 4, 4' on the front supporting shaft 8 respectively.

The reset arrangement of the seat unit comprises a return bolt 23 which extends through the front plate 18 and fits with the nut 25 mounted at the inner side of the n-shaped frame 3. Between the head of the bolt 23 and the outer side of the front plate 18 is fit with a nut 24 on the threaded body of the bolt 23.

The locking arrangement comprises the electromagnetic controller 30 (see FIG. 3), a moving bar 62, a moving head 63, a locking member 61, an upper locking socket 31 and a lower locking socket 32. The upper locking socket 31 is mounted on a plate 26 on the n-shaped frame 3. The lower locking socket 32 is correspondingly arranged on the upper cover 20 of the rails 16, 16'. In a normal state of the seat unit, the upper and lower locking sockets 31, 32 are in alignment and the locking member 61, having a shape corresponding to that of the center holes of the locking sockets 31, 32, extends therein. The moving bar 62 is fixedly connected with the moving head 63. The moving head 63 is arranged in the controller 30. The moving bar 62 extends in the center hole of the locking member 61. A flange is formed at the end of the moving bar 62, which extends out of the center hole of the locking member 61. The outer diameter of the flange is less than the least diameter of the center holes of the upper and lower locking sockets 31, 32, and greater than that of the center hole of the locking member 61.

The center holes of the upper and lower locking sockets 31, 32 aligned form a completely tapered hole (FIGS. 5A, 5B, 6A and 6B) to receive the locking member 61 with a tapered outer surface.

The electromagnetic controller 30 has a cylinder case 67, in which a column coil 65 and a thin wall cylinder 64 are arranged in serial. The thin wall cylinder 64 is made of non-magetconductive material. The cylindrical moving head 63 is solidably arranged in the thin wall cylinder 64. A magnetconductive member 66 is provided in the upper part of the case 67. Through holes 69 are formed in both the upper side 68 of the case 67 and the member 66. A non-magnetconductive member 90 may be provided in the lower portion of the case 67, so that a magnetic line of force is concentrated in the moving bar 62 and moving head 63 to strengthen the raising force.

The second embodiment of the invention is similar to the first one and the differences between them are in that the upper locking socket 81 has a tapered center hole, the lower locking socket 82 has a cylindrical center hole and the locking member 83 has a shape of a combination of taper and cylinder (see FIGS. 7A, 7B, 8A, 8B, 9A and 9B).

The third embodiment of the invention is similar to the first one and the differences between them are in that the upper locking socket 91 has a cylindrical center hole, the lower locking socket 92 has a tapered center hole, and the locking member 93 has a shape of a combination of cylinder and taper (see FIGS. 10A, 10B, 11A, 11B, 12A and 12B).

The fourth embodiment of the invention is similar to the first one and the differences between them are in that both the center holes of the lower and upper locking socket 108, 102 have a shape of a cylinder with the same diameter and the locking member 103 has a cylindrical shape (see FIGS. 13A, 13B, 14A and 14B).

Figure 4:
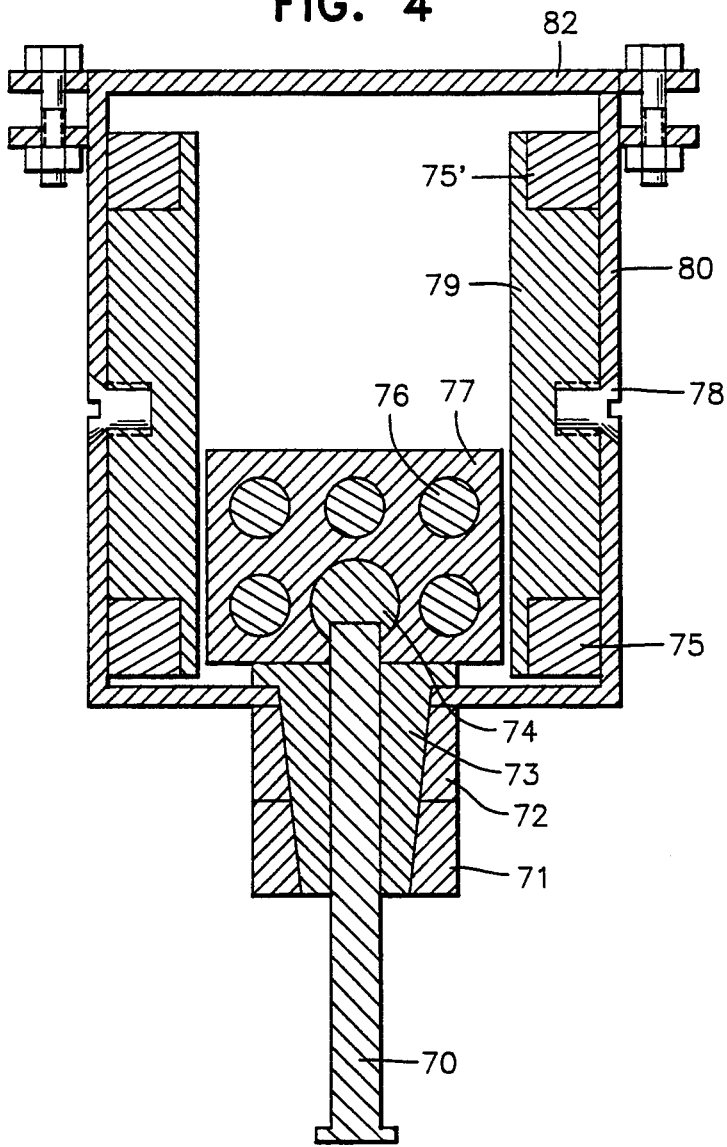
FIG. 4 shows another electromagnetic controller having a structure different from the one shown in FIG. 3.
Figure 5A:
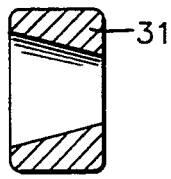
FIGS. 5A, 5B, 6A and 6B are respectively sectional and side views of the upper and lower locking sockets according to the first embodiment of the invention.
Figure 5B:
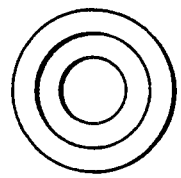
Figure 6A:
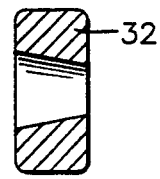
Figure 6B:
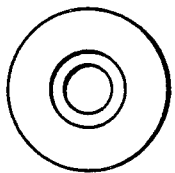
Figure 7A:
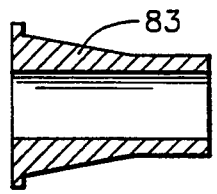
FIGS. 7A, 7B are respectively the side and sectional views of the locking member according to the second embodiment of the invention.
Figure 7B:
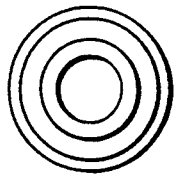

The fifth embodiment of the invention is similar to the first one and differences between them are in that: the controllers 30 and/or 40 (see FIG. 4) are generally linear motors. That is, in the case 80 of the motor, the iron-core 79 is fixed by screws 78. Coils 75, 75' are wound on the iron-core 79. The moving head 77 is made of silicon steel plates and have a armature coil 76. A moving bar 70 is connected with the moving head 77 with a coupler 74 which is fixedly connected with the moving bar 70.

Figure 3:
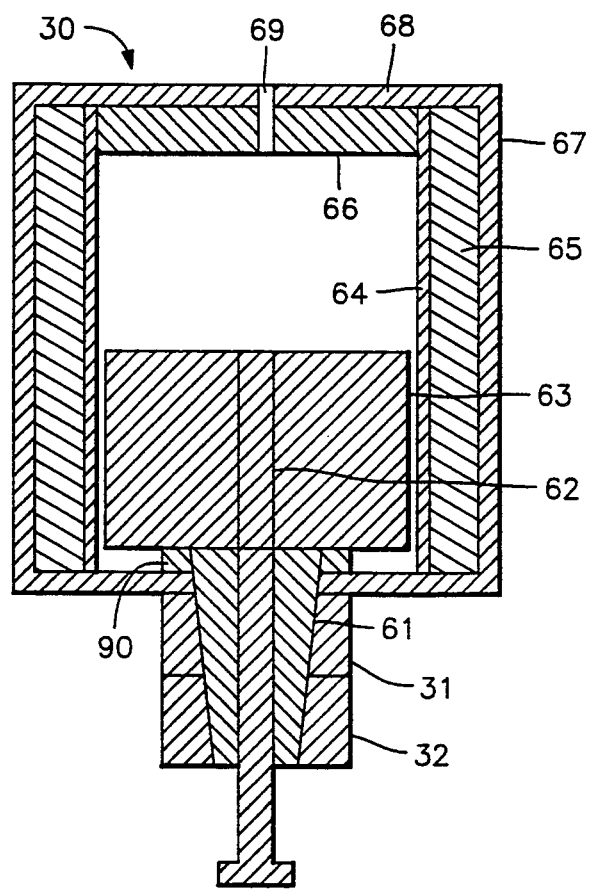
FIG. 3 is a schematic sectional view of a electromagnetic controller.

Referring to FIGS. 1 and 3, in order to reset the seat, first the bolt 23 is screwed into the nut 25 of the frame 3 through the front plate 18, and then the nut 24 is turned by a wrench to force the bolt to move forwardly so that the seat is pulled forwardly and the springs are compressed, until the upper and lower locking sockets 31, 32 are closed to the aligning position. After the switch K2 is turned on to magnetically drive the moving bar 62 with the locking member 61 into the electromagnetic controller 30, the nut 24 continues to be turned to pull the seat forwardly until the upper and lower locking sockets are aligned. Then the switch K2 is turned off so that the controller 30 releases the moving bar 62 and the locking member 61 falls into the center holes of the upper and lower locking sockets 31, 32, thereby the seat is locked. After the bolt 23 with the nut 24 is removed, the reset operation is finally finished. Upon the occasion of deformation of the sensors 50 installed at the parts of the motor vehicle which are prone to be damaged in a collision, the power is on and the controller 30 forces the moving head 63 with moving bar 62 to raise. Because of a distance between the flange at the end of the moving bar 62 and lower side of the locking member 61, when the flange contacts the locking member 61, the speed of the moving bar 62 has reached a certain value and the moving head 63 has been moved to the upper portion of the controller 30 where the magnetic force is maximum, which facilitates the locking member 61 removed from the center holes of the locking sockets. Then after being unlocked and under the action of the biased springs 10, the seat is pushed backwardly to move away from the dangerous area. At the same time, the braking electromagnetic controller 40 is on to drive the braking control lever 41 to stop the motor vehicle.

Suppose that F is the force that the moving bar 62 impacts on the locking member 61.

$M_{61}$ is the mass of the locking member 61.

$\Delta t$ is impacting time.

V' is the speed of the locking member 61 after impact.

$V_o$ is the initiative speed of the locking member 61 before impact, obviously $V_o = 0$ According to Theory of Momentum $$F \cdot \Delta t = M61 \ (V - Vo) \quad (1)$$

M63 is the mass of the moving head 63.
M62 is the mass of the moving bar 62.
V″ is the speed of the moving head 63 and the moving bar 62 after impact.
V is the speed at the time when the flange contacts with the locking bar 61.
then $$(M62+M63)V=(M63+M62)V''+M61 \ V' \quad (2)$$

Because $$V'=V''$$

Then $$(M62+M63) \ V=(M63+M62)V'+M61 \ V'$$

Solving the equations (1) and (2)

$$(M63+M62) \ V=(M63+M62) \ V'+F\Delta t$$

Then $$F = \frac{(M63 + M62) \ (V' - V)}{\Delta t}$$

Because the value of Δt is very little and particularly the moving bar 62 has obtained a speed V of great value while the speed V″ of the moving bar 62 and moving head 63, after impact, is less, the impact force F is greater, which facilitates the release of the locking member 61. From above it is found that less magnetic force is required to release the locking member 61, which results in less value of the electric current for generating magnetic force.

While the description of the invention has been given with respect to preferred embodiments, it is not to be constructed in a limited sense. Variations and modification will occur to those skilled in the art. Reference is made to the appended claims for a definition of the invention.

What is claimed is:

1. A safe driver seat unit in a motor vehicle comprises:

a seat, a supporting arrangement, a rail unit, a locking arrangement, sensors, an electric braker; a sensing switch connected with the sensors in parallel; a braking electromagnetic controller connected with an electromagnetic controller of the locking arrangement in parallel; with said parallel connections being connected with an electric battery and a power switch in series;

the seat being provided on the rails; and in front of the seat are arranged springs; the locking arrangement being controlled by the electromagnetic controller; the springs being used to push the seat to move backwardly in an off-lock state of the seat;

the electric braker comprises the braking electromagnetic controller and a braking control lever is provided to apply an automotive braking operation on the motor vehicle synchronized with the releasing operation by the lock arrangement when the sensor is deformed during a vehicle collision; the braking control lever being connected with a brake pedal operated by the driver;

the sensors being arranged at parts of the motor vehicle prone to collision, each of which comprises a deformable thin wall metal pipe and a metal rod which inserts in and is insulated from the wall pipe; wherein:

a supporting arrangement has an n-shaped frame; two supporting shafts respectively extend through the two side walls of the frame in parallel and mounted therein by nuts;

at inner sides of the frame, backup plates, ball bearings and spring acting cylinders are respectively and serially arranged on each supporting shaft; the backup plates and the spring acting cylinders have outer diameters less than the inner diameter of outer rings of the ball bearings;

on each of said two supporting shafts, an adjusting cylinder is arranged between each pair of spring acting cylinders; a thread is formed in one end of the adjusting cylinder to fit with an adjusting nut, a clamping nut of the adjusting nut, and a spacer;

one end of the adjusting nut has a shape of a cylinder and a follower sheet being arranged between the tip of the cylindrical end and the spring acting cylinder;

under the coaction of the nuts and the adjusting nut, inner rings of the ball bearings and side walls of the frame are fixedly mounted together;

the rail unit having two parallel rails mounted on a fixed floor and extending longitudinally thereon; an upper cover being fixed on the rails with screws, and back and front plates being mounted at front and back ends of the rails, respectively;

the rails being rectangular blocks; a longitudinal groove being formed in each rail; fourth ball bearings arranged in pairs in the longitudinal grooves; the width of the longitudinal grooves corresponding to the outer diameter of the outer ring of the ball bearings;

at the back ends of the rails is pivoted a retaining hook having a head formed downwardly and backwardly; the upper cover having a hole formed correspondingly to a position of the hook for rotation of the hook; a hole being formed in a back plate for manual operation to release the seat locked by the hook; buffer cushions made of sponge material being arranged at back ends of the longitudinal grooves;

the two ends of each spring being mounted on the front plate and the spring acting cylinders of the front supporting shaft respectively;

a reset arrangement comprising a return bolt extending through the front plate and fit with the nut mounted at the inner side of the n-shaped frame; between a head of the bolt and an outer side of the front plate is fit with a nut on a threaded body of the bolt;

the locking arrangement comprises the electromagnetic controller, a moving bar, a moving head, a locking member, an upper locking socket and a lower locking socket; the upper locking socket being mounted on a plate on the n-shaped frame; the lower locking socket being correspondingly arranged on the cover of the rails; in a normal state of the seat unit, the upper and lower locking sockets being in alignment; the locking member, having a shape correspondent to that of the center holes of the locking sockets, extends therein;

the moving bar being fixedly connected with the moving head; the moving head being arranged in the electromagnetic controller, the moving bar extending in the center hole of the locking member, a flange being formed at an end of the moving bar, which extends out of the center hole of the locking member; the outer diameter of the flange being less than the least diameter of the center holes of the upper and lower locking sockets, and greater than that of the center hole of the locking member.

2. A safe driver seat in a motor vehicle as claimed in claim 1, wherein, the electromagnetic controller has a cylinder case, in which a coil and a thin wall cylinder are arranged with the thin wall cylinder inside of the coil; the thin wall cylinder is made of non-magnetconductive material; the cylindrical moving head is arranged in the thin wall cylinder; a magnetconductive member is provided in the upper part of the case; through holes are formed in both the upper side of the case and the magnetconductive member.

3. A safe driver seat in a motor vehicle as claimed in claim 1, wherein, the center holes of the upper and lower locking socket form completely tapered center holes after alignment and the locking member has a correspondent tapered shape.

4. A safe driver seat in a motor vehicle as claimed in claim 1, wherein, the upper locking socket has a tapered center hole, the lower locking socket has a cylindrical center hole and the locking member has a correspondent shape of a combination of taper and cylinder.

5. A safe driver seat in a motor vehicle as claimed in claim 1, wherein, the upper locking socket has a cylindrical center hole, the lower locking socket has a tapered center hole, and the locking member has a correspondent shape of a combination of cylinder and taper.

6. A safe driver seat in a motor vehicle as claimed in claim 1, wherein, both the center holes of the lower and upper locking socket have a shape of a cylinder with the same diameter and the locking member is correspondently of cylindrical shape.

7. A safe driver seat in a motor vehicle as claimed in claim 1, wherein, at least one of the electromagnetic controller and the braking electromagnetic controller are linear motors; and in the motor, an iron-core is fixed by screws; coils are wound on the iron-core; the moving head is made of silicon steel plates and has an armature coil; a moving bar is connected with the moving head with a coupler fixedly connected with the moving bar.

* * * * *